United States Patent

Smith et al.

(10) Patent No.: US 6,884,904 B2
(45) Date of Patent: Apr. 26, 2005

(54) MDI-BASED POLYURETHANE PREPOLYMER WITH LOW MONOMERIC MDI CONTENT

(75) Inventors: Andrea Karen Smith, Macungie, PA (US); Richard Joseph Goddard, Souderton, PA (US); Evelyn Jennifer Lin Paulsen, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/833,278

(22) Filed: Apr. 12, 2001

(65) Prior Publication Data

US 2003/0009049 A1 Jan. 9, 2003

(51) Int. Cl.$^7$ .................. C07C 271/28; C08G 18/10
(52) U.S. Cl. .................. 560/26; 528/77; 528/44; 528/65; 528/66; 525/123; 524/507; 524/839
(58) Field of Search .................. 528/60, 76; 252/182.2; 428/423.1; 156/331.7; 525/63; 560/26

(56) References Cited

U.S. PATENT DOCUMENTS

| | | | |
|---|---|---|---|
| 4,385,132 A | 5/1983 | Gruber et al. | |
| 4,888,442 A | 12/1989 | Dunlap et al. | 560/352 |
| 5,202,001 A | 4/1993 | Starner | 203/49 |
| 5,441,808 A | 8/1995 | Anderson | 428/349 |
| 5,703,193 A | 12/1997 | Rosenberg | 528/44 |
| 5,821,316 A | 10/1998 | Quay et al. | 528/64 |
| 6,133,415 A | 10/2000 | Markley et al. | 528/497 |

FOREIGN PATENT DOCUMENTS

| | | |
|---|---|---|
| DE | 19957351 | 10/2001 |
| EP | 0 392 788 B1 | 3/1997 |
| EP | 0827995 | 3/1998 |
| EP | 0827995 | * 11/1998 |
| JP | 8176252 | 7/1996 |
| JP | 8176252 A | 7/1996 |
| WO | WO 01/40340 A2 | 6/2001 |
| WO | WO0140340 | 6/2001 |
| WO | WO0140342 | 6/2001 |

* cited by examiner

Primary Examiner—D. Margaret Seaman
Assistant Examiner—Taylor V Oh
(74) Attorney, Agent, or Firm—Michael Leach

(57) ABSTRACT

An MDI/polypropylene polyether prepolymer composition consisting essentially of at least 80 wt % perfect prepolymers and less than 2 wt % free MDI monomer suitable for use in polyurethane adhesive compositions optionally also comprising a curative for isocyanate groups.

16 Claims, No Drawings

MDI-BASED POLYURETHANE PREPOLYMER WITH LOW MONOMERIC MDI CONTENT

FIELD OF THE INVENTION

This invention relates to 4,4'-diphenylmethane diisocyanate (MDI) based polyurethane prepolymers having a controlled structure.

BACKGROUND OF THE INVENTION

Isocyanate terminated prepolymers are commonly used to produce polyurethane and/or polyurea products like elastomers, foams, coatings, adhesives, sealants, caulks, and binders. However, the prepolymer manufacturing process can often result in high residual concentrations of the polyisocyanates used in the prepolymer synthesis. The residual polyisocyanate can lead to potential health and safety issues, and may also be detrimental to the performance and attributes of the end use product. For example, residual polyisocyanate can lead to undesired losses in open time, product instability, increased moisture sensitivity and decreased adhesion due to migration of these molecules to the interface. Polyurethane prepolymers that contain controlled levels of residual polyisocyanate, preferably below 1 wt %, can reduce health and safety risks and improve end product performance.

Since residual polyisocyanate can pose significant health and safety risks as well as reductions in product performance, a number of products and processes have been introduced that offer reduced residual polyisocyanate levels. A variety of methods are taught in the patented art for reducing the residual isocyanate content of polyisocyanate adducts: wiped film evaporation, solvent aided distillation/co-distillation, molecular sieves, and solvent extraction.

JP 08176252 discloses reacting MDI with straight chain molecule with MW 250–4000 and two active hydrogens at an equivalent ratio (NCO:OH) of 2.5–10:1. Free MDI is vacuum distilled to 1 wt % or less. The examples show polytetramethylene glycol (PTMEG) and ethylene glycol adipate.

U.S. Pat. No. 5,202,001 discloses preparing urethane prepolymers having low levels of residual organic diisocyanate. The examples show only prepolymers made from toluene diisocyanate TDI, isophorone diisocyanate IPDI and methylene-bis[(4-cyclohexyl)-diisocyanate] CHDI.

U.S. Pat. No. 5,703,193 discloses a process for reducing the amount of residual organic diisocyanate monomer in a polyurethane prepolymer reaction product by distilling in the presence of an inert solvent blend, one with boiling point above the monomer and one with boiling point below. Comparative examples show the removal of MDI monomer from a PTMEG 1000/MDI prepolymer reaction product.

U.S. Pat. No. 5,441,080 discloses a reactive hot melt composition comprising a polyester polyether thermoplastic elastomer and a polyisocyanate prepolymer. A MDI/PTMEG prepolymer is shown blended with a thermoplastic copolymer.

U.S. Pat. No. 6,133,415 discloses countercurrent extraction method for making polyurethane prepolymers. The examples show MDI/PTMEG prepolymers processed to give low free MDI.

U.S. Pat. No. 4,888,442 discloses a process for reducing the free monomer content of a polyisocyanate adduct by treating the adduct with 2–30 wt % inert solvent in an agitated thin-layer evaporator under conditions sufficient to reduce the free monomer content of the polyisocyanate adduct mixture below that level which is obtainable in the absence of a solvent. There are no examples showing the use of MDI as a suitable diisocyanate to prepare the polyisocyanate adduct.

U.S. Pat. No. 5,821,316 discloses an isocyanate-terminated polyurethane prepolymer comprising the reaction product of a polyisocyanate and a particular polyol composition. While the examples show the use of polypropylene oxide glycols, only TDI was used as the polyisocyanate.

EP 0 827 995 discloses hot melt adhesives comprising a polyisocyanate prepolymer prepared by reacting a polyisocyanate with a functionality of at least 2 with a polyol with a functionality of at least 2, the reaction product comprising at least 90 wt % "perfect" prepolymer and less than 2 wt % unreacted isocyanate monomer and the prepolymer having a free NCO functionality ranging from 0.2 to 8 wt %.

Airthane® prepolymers marketed by Air Products and Chemicals, Inc. are controlled structure prepolymer compositions. These prepolymer compositions which are based on TDI and IPDI contain >90 wt % perfect 2:1 prepolymer adducts, i.e., <10 wt % oligomer, and <0.1 wt % residual monomeric isocyanate.

We have found that 4,4'-diphenylmethane diisocyanate/polypropylene glycol (MDI/PPG) prepolymers low in free MDI monomer content can be synthesized which show performance advantages over conventional MDI/PPG prepolymers.

SUMMARY OF THE INVENTION

The present invention is directed to a controlled structure isocyanate terminated prepolymer composition based on the reaction of 4,4'-diphenylmethane diisocyanate (MDI) with a polyol composition comprising a propylene oxide based polyether polyol. The prepolymer reaction product has low levels of residual MDI monomer and low oligomer content. The residual, or free, MDI monomer content is less than 2 wt % of the prepolymer composition.

The MDI prepolymer composition is the product resulting from the reaction of a polypropylene polyether polyol containing "n" (at least 2) OH groups and an MDI-type polyisocyanate. The MDI/polypropylene polyether polyol prepolymer reaction product comprises oligomers and "perfect" prepolymers. The requisite low oligomer content of the prepolymer composition is <20 wt % or, reciprocally, it can expressed in terms of its "perfect" prepolymer content which should be >80 wt %. A "perfect" prepolymer of the present invention in terms of stoichiometry is a prepolymer of n MDI molecules and one polypropylene polyether polyol molecule. The stoichiometric proportions for the MDI and polyol in the reaction products are 2:1 in the case of diols and 3:1 for triols. The perfect prepolymer is essentially an adduct containing only one molecule of the polyol in each prepolymer molecule. The invention requires that this polyisocyanate prepolymer reaction product (1) consists essentially of at least 80 wt % of a stoichiometric "perfect" prepolymer and (2) contains less than 2 wt % unreacted MDI monomer.

Also provided is a method for adhesively joining or sealing two substrates using such MDI/polypropylene polyether polyol prepolymer compositions as adhesives. The method generally comprises (1) applying onto a substrate a urethane adhesive composition comprising the controlled structure MDI/ polypropylene polyether polyol prepolymer reaction product having the defined low levels of oligomers and free MDI monomer, and (2) contacting the adhesive composition disposed on the substrate to a second substrate such that a bond is formed.

Advantages associated with the use of such controlled structure isocyanate prepolymers include an ability to formulate adhesives that show improved green strength compared to those formulated using conventionally prepared isocyanate terminated prepolymers, an ability to formulate adhesives showing improved ambient, or room, temperature development of strength the ability to tailor oligomer content and monomer content for controlling properties like viscosity, processability, and the health and safety benefits associated with lower levels of volatile diisocyanate monomer content.

an ability to formulate laminating adhesives showing longer pot lives while maintaining faster development of adhesive strength.

DETAILED DESCRIPTION OF THE INVENTION

This invention relates to certain polyurethane prepolymer compositions based on the reaction of an MDI-type polyisocyanate and a polyol composition comprising a polypropylene polyether polyol, the prepolymer compositions having a low level of residual MDI monomer and a low oligomer content. These prepolymers are controlled structure polyurethane prepolymers comprising the reaction product of an MDI-type polyisocyanate (A) having a functionality (f) of at least two, with a polypropylene polyether polyol (B) of functionality (f)≧2. The prepolymer reaction product should contain free prepolymer NCO functionality ranging from 0.2 to 15 wt %. The molecular weight distribution, i.e. distribution of perfect prepolymer to high order oligomers, is controlled in these prepolymer compositions, as well as the amount of free MDI monomer content. Thus the prepolymer compositions contain free prepolymer NCO ranging from 0.2 to 15 wt % preferably 0.5 to 8 wt %, and less than 2 wt % unreacted MDI monomer, preferably less than 1 wt %, and most desirably less than 0.5 wt %. At least 80 wt %, preferably 90 wt %, of the prepolymer reaction product obtained by the reaction of the MDI-type polyisocyanate with the polyol should comprise "perfect" prepolymers, or reciprocally no more than 20 wt % oligomers, preferably no more than 10 wt % oligomers.

A "perfect" prepolymer, or adduct, is the perfect end capping product of a polypropylene polyether polyol (B) with n MDI molecules (A), where n=the functionality (f) of B. For a difunctional B, the perfect prepolymer is represented as A:B:A. Oligomers, for a difunctional B (n=2), are any species with a composition greater than the perfect 2:1 molecular ratio (A:B:A), for example 3:2 (A:B:A:B:A) or 4:3 (A:B:A:B:A:B:A). For a trifunctional B (n=3), the perfect prepolymer is represented as B:3A. Oligomers in this instance are any species with a composition greater than the perfect 3:1 molecular ratio.

The urethane adhesive composition used in the present method comprises the above-described MDI/polypropylene polyether polyol prepolymer reaction product which can be prepared by reacting an MDI-type polyisocyanate having an NCO functionality of at least 2 with a polypropylene polyether polyol, preferably performing the reaction in an NCO:OH equivalent ratio of ≧4:1, preferably, 6–10:1. The unreacted MDI monomer in the prepolymer reaction product is removed by distillation or other treatment to a concentration of <2 wt %, preferably <1 wt %, most preferably <0.5 wt %. The prepolymer reaction product should contain prepolymer isocyanate, i.e., free prepolymer NCO functionality, ranging from 0.2 to 15 wt %, preferably, 0.5 to 8 wt %.

Such MDI/polypropylene polyether polyol prepolymers may be prepared according to the teachings of U.S. Pat. Nos. 4,786,703 and 5,202,001, which disclosures are incorporated by reference.

The prepolymer reaction products are prepared using MDI as exemplified by the polyisocyanates of the diphenylmethane series—including, but not limited to various isomeric mixtures of MDI and/or polymeric MDI: MDI; isomeric mixtures of MDI containing 30–98 wt % of 4,4' isomer, 2–70 wt % of the 2,4' isomer, and 0–5 wt % of the 2,2' isomer (with the wt % totaling 100%); polymethylene poly(phenylisocyanate) having an average isocyanate functionality of 2.1 to 3.5, isocyanate group content of 18.0 to about 33.6, and containing about 30 to 96 wt % monomeric 4,4' MDI, about 2–70 wt % monomeric 2,4' MDI, and less than 5 wt % monomeric 2,2' MDI, and from 2–60 wt % higher ring homologues of the MDI series (with the wt % totaling 100%).

Suitable polypropylene oxide based polyether polyols, also known as polypropylene glycols (PPG), include, but are not limited to, polypropylene polyether polyols with functionality of two or greater, average equivalent weight between 100 and 8000. Also included are ethylene oxide capped PPGs and low monol containing PPGs, marketed as Acclaim® polyols from Bayer. Additional polyols which may be used at 0 to 60 wt % of the polyol composition include other di- or multi-functional alkylene ether polyols like PTMEG and polyethylene oxide, polyester polyols, polyester polyols from polycaprolactones and hydroxyl terminated polybutadienes.

The above polyether and polyester polyols are commonly used for producing polyurethane prepolymers and can be blended such that the polyol composition (single or blend) used in making the prepolymer typically has an average Mn ranging from about 400 to 16,000, and typically from 700 to about 8000.

In the preferred prepolymer synthesis, it is important to maintain a high equivalent ratio of MDI to the polyol, e.g., a range from 4 to 20:1. As the level of MDI to polyol approaches 4:1 and then stoichiometric, greater quantities of higher molecular weight oligomers are formed which detract from the handling and/or performance characteristics of the urethane prepolymer composition. Preferably, the equivalent ratio of MDI to polyol in the reaction is from 6 to 10:1 equivalents of MDI to polyol to produce oligomers at less than 20 wt %, preferably less than 10 wt %.

In addition to the MDI/polypropylene polyether prepolymer, the urethane adhesive composition optionally contains a curative composition as is well known in the art. Suitable curative compositions include diamines, polyols, or blends thereof, as well as optional catalyst, thickening agent, or drying agent. Examples of diamines include both aromatic and aliphatic diamines, primary and secondary amine terminated polyether polyols, and difunctional, trifunctional, and polymeric amines. Examples of polyols include polyester or polyether polyols, which can be diols, triols and tetrols, having primary, secondary and/or tertiary alcohol groups. These polyols may be mixed with the diamines.

Optional catalysts include tertiary amine catalysts and suitable organometallic catalysts, such as those derived from tin, zirconium, and bismuth. Other optional additives include thickening, coloring and drying agents.

Substrates that may be bonded with the adhesive include cold rolled steel, aluminum, fiberglass reinforced polyester (FRP), sheet molding compound (SMC), plastics, wood, and glass.

The following materials were used in the Examples:
Arcol® PPG 725, from Bayer Corp.
Arcol® PPG 2025, from Bayer Corp.
Tri(propylene)glycol (TPG), from Morton Thiokol.
Quadrol® polyol from BASF Corp.
Microtuff 325F talc from Barretts Minerals Inc.
Cab-o-sil TS 720 fumed silica from Cabot Corp.
Aluminum Powder, 325 Mesh, Grade 101, from Toyal America Inc.
Microbeads (10 mil), from Cataphote.
Zinc coated cold rolled steel (Zn CRS) from ACT Laboratories, Inc.
Mondur M (MDI) from Bayer Corp.
Oriented polypropylene (OPP) film Bicor® SPW or AQS from Mobil Chemical Corp.
Polyethylene Adipate (PEA) 550 of Mn.
1,4-Butanediol (BDO) from BASF Corp.

EXAMPLE 1

4186 g of Methylene diisocyanate (MDI) were added to a reactor and heated to 80° C. 1264 g of PPG 725 was then added. The reaction temperature was held at 80° C. overnight. Excess residual MDI was removed by distillation under reduced pressure from the reaction product to a level of 0.63 wt % residual MDI, and total % NCO content of 6.74%.

EXAMPLE 2

606 g of MDI were added to a reactor and heated to 80° C. 897 g of PPG 725 was then added. The reaction temperature was held at 80° C. overnight. The reaction product had a % NCO content of 6.49%.

EXAMPLE 3

4192 g of MDI were added to a reactor and heated to 80° C. 1143 g of PPG 2025 and 246 g of tri(propylene)glycol (TPG) was then added. The reaction temperature was held at 80° C. overnight. Excess residual MDI was removed by distillation under reduced pressure from the reaction product to a level of 0.40 wt % residual MDI, and total % NCO content of 6.57%.

EXAMPLE 4

604 g of MDI were added to a reactor and heated to 80° C. 812 g of PPG 2025 and 174 g of tri(propylene)glycol (TPG) was then added. The reaction temperature was held at 80° C. overnight. The reaction product had a % NCO content of 6.60%.

Table 1 presents the % NCO, residual free MDI and oligomer content for the MDI/PPG polymers of Examples 1–4.

TABLE 1

| Example | Polyol | % NCO | residual MDI (wt %) | % oligomer |
|---|---|---|---|---|
| 1 | PPG725 | 6.74 | 0.63 | 4 |
| 2 | PPG725 | 6.49 | >5 | >50 |
| 3 | PPG2025/TPG | 6.57 | 0.40 | 8 |
| 4 | PPG2025/TPG | 6.60 | >5 | >50 |

EXAMPLE 5

The prepolymer compositions of Examples 1–4 were evaluated in the following structural adhesive composition by room temperature curing on a Zn CRS substrate:

| Part A | wt % | Part B | wt % |
|---|---|---|---|
| Prepolymer (1–4) | 60 | Arcol ® PPG2025 | 16.7 |
| Aluminum Powder | 38 | Quadrol ® | 33.3 |
| Cab-o-sil TS720 | 2 | Microtuff 325F | 27 |
|  |  | Cab-o-sil TS720 | 1 |
|  |  | Aluminum Powder | 22 |

The adhesive was prepared by mixing Part A and Part B in an NCO:OH ratio of 1:0.9 while adding 1 wt % of microbeads. The adhesive mixture was then applied to one side of a 1"×4" (2.54×0.16 cm) substrate coupon to cover at least 0.5 in$^2$ (3.23 cm$^2$) of area then mated with a second substrate coupon to give a total lapshear overlap of 0.5 in$^2$ (3.23 cm$^2$). Samples were cured at room temperature and 50% humidity. Samples were prepared and tested according to ASTM D10002 after 1 day and 7 days. All testing done at room temperature.

TABLE 2

| Prepolymer | Cure | Shear strength (psi) after 1 day | Shear strength (psi) after 7 days | % Cure (1 d/7 d) |
|---|---|---|---|---|
| Ex 1 | RT | 1240 | 1452 | 85 |
| Ex 2 | RT | 981 | 1367 | 72 |
| Ex 3 | RT | 1324 | 1617 | 82 |
| Ex 4 | RT | 874 | 1684 | 52 |

The data in Table 2 shows that structural adhesives exhibiting fast room temperature cure on zinc cold rolled steel (Zn CRS), i.e. high % cure (1d/7d), can be prepared with the low monomeric, low oligomer MDI/polypropylene polyether prepolymer in Examples 1 and 3 according to the invention.

EXAMPLE 6

The prepolymer compositions of Examples 1–4 were evaluated in a two component laminating adhesive composition prepared by mixing the prepolymer with polyethylene adipate (MW 550) at the NCO:OH ratio show in Table 3. The substrate was an oriented polypropylene (OPP) film (Mobil Bicor® SPW or AQS). Laminates were prepared by applying the adhesive to a corona treated film, drawing down the adhesive with a 0 size teflon treated rod, mating with a second sheet of corona treated film, and cutting the laminate into 1 inch (2.54 cm) strips. The laminate was heat sealed at 186° F. (85° C.) for 2 seconds and placed in a 35° C. oven for one hour before testing. The 180° peel strength of the films was obtained by pulling the two ends of 1 inch strip laminates in a 180° configuration at a crosshead speed of 12 in/minute (30.48 cm/minute) for a total distance of 1 inch on an Instron testing machine. Report average peel strength (pli) as determined by an Instron method perimeter. This perimeter is usually displacement, where the average peel results are calculated between two set points; an initial starting point (after initial load) and ending after 1 inch of sample peel. The potlife or working life of the laminating adhesive compositions was also determined. Pot life was defined as the time when the adhesive composition can no longer be drawn down effectively. The data are shown in Table 3.

TABLE 3

| Prepolymer | | | Pot | T-peel Strength (pli) after x hours | | |
|---|---|---|---|---|---|---|
| Example | NCO:OH | Film | Life | 12–14 h | 18 h | 30 h |
| 1 | 1.05:1 | AQS | 35 min | 3.7 | Film tear | Film tear |
| 2 | 1.05:1 | SPW | 13 min | 1.22 | 2.0 | 3.6 |
| 3 | 1.11:1 | SPW | 10 min | 1.6 | 2.6 | 5.3 |
| 4 | 1.11:1 | SPW | 8 min | 0.46 | 0.91 | 2.8 |

Example 1 and 3 low monomeric, low oligomer prepolymers according to the invention each showed longer pot life while maintaining faster development of film t-peel strength.

EXAMPLE 7

Cast elastomers were prepared by conventional techniques using the prepolymers in Examples 3 and 4 and with 1,4-butane-diol (BDO) curative at 90% stoichiometry, then curing at 100° C. for 16 hours. Physical properties were obtained using the following ASTM test methods: Hardness (ASTM D2240) and Modulus, Elongation and Tensile Strength (ASTM D412). Table 4 shows the data.

TABLE 4

| Prepolymer Example | Hardness Shore A | Modulus (psi) | | | Tensile strength at break (psi) | (%) Elongation |
|---|---|---|---|---|---|---|
| | | 100% Elongation | 200% Elongation | 300% Elongation | | |
| 3 | 90 | 1214 | 1902 | 3163 | 4084 | 335 |
| 4 | 87 | 726 | 1205 | 1586 | 2049 | 301 |

The low monomeric, low oligomer prepolymer of Example 3 showed superior modulus, tensile strength and % elongation in comparison to Example 4.

STATEMENT OF INDUSTRIAL APPLICATION

The invention is a controlled structure MDI/PPG polyurethane prepolymer composition for making products like elastomers, foams, coatings, adhesives, sealants, caulks, and binders.

We claim:

1. In a method for adhesively joining or sealing two substrates using a polyurethane adhesive composition comprising a polyurethane prepolymer composition and, optionally, an isocyanate-reactive curative by applying onto a substrate the polyurethane adhesive composition and contacting the adhesive composition disposed on the substrate to a second substrata such that a bond is formed, the Improvement which comprises utilizing a polyurethane prepolymer composition comprising the prepolymer reaction product of (a) 4,4'-diphenylmethane diisocyanate (MDI) and (b) a polyol composition comprising a propylene oxide based polyether polyol and consisting essentially of at least 80 wt % perfect prepolymers and less than 2 wt % free MDI monomer.

2. The method of claim 1 in which the 4,4'-diphenylmethane diisocyanate comprises isomeric mixtures of MDI and/or polymeric MDI.

3. The method of claim 1 in which the 4,4'-diphenylmethane diisocyanate comprises an isomeric mixture of MDI containing 30–98 wt % of 4,4' isomer, 2–70 wt % of the 2,4' isomer, and 0–5 wt % of the 2,2' isomer (with the wt % totaling 100%); and/or polymethylene poly (phenylisocyanate) having an average isocyanate functionality of 2.1 to 3.5, isocyanate group content of 18.0 to about 33.6, and containing about 30 to 96 wt % monomeric 4,4' MDI, about 2–70 wt % monomeric 2,4' MDI, and less than 5 wt % monomeric 2,2' MDI, and from 2–60 wt % higher ring homologues of the MDI series (with the wt % totaling 100%).

4. The method of Claim 1 in which the propylene oxide based polyether polyol is a polypropylene polyether polyol with functionality of two or greater and an average equivalent weight between 100 and 3000.

5. The method of claim 1 in which the propylene oxide based polyether polyol is an ethylene oxide capped polypropylene polyether polyol.

6. The method of claim 1 in which 0 to 60 wt % of the polyol composition comprises a di- or multi-functional alkylene ether polyol, a polyester polyol, a polyester polyol from polycaprolactones or a hydroxyl terminated polybutadienes.

7. The method of claim 1 in which the polyurethane prepolymer composition consists essentially of at least 90 wt % perfect prepolymers.

8. The method of claim 1 in which the polyurethane prepolymer composition consists essentially of less than 1 wt % free MDI monomer.

9. The method of claim 1 in which the polyurethane prepolymer composition comprises a free prepolymer NCO functionality ranging from 0.2 to 15 wt %.

10. The method of claim 1 in which the polyurethane polyol composition has an average Mn ranging from about 400 to 16,000.

11. In a method for adhesively joining or sealing two substrates using a polyurethane adhesive composition comprising a polyurethane prepolymer composition and, optionally, an isocyanate-reactive curative by applying onto a substrate the polyurethane adhesive composition and contacting the adhesive composition disposed on the substrate to a second substrate such that a bond is formed, the improvement which comprises utilizing a polyurethane prepolymer composition comprising the reaction product of (a) 4,4'-diphenyl-methane diisocyanate with a polyol composition comprising a polypropylene polyether polyol with functionality of two or greater and an average equivalent weight between 100 and 8000 and consisting essentially of at least 90 wt % perfect prepolymers, less than 2 wt % free MDI monomer and a free prepolymer NCO functionality ranging from 0.2 to 15 wt %.

12. The method of claim 11 in which the 4,4'-diphenylmethane diisocyanate comprises an isomeric mixture of MDI containing 30–98 wt % of 4,4' isomer, 2–70 wt % of the 2,4' isomer, and 0–5 wt % of the 2,2' Isomer (with the wt % totaling 100%); and/or polymethylen poly(phenylisocyanate) having an average isocyanate functionality of 2.1 to 3.5, isocyanate group content of 18.0 to about 33.6, and containing about 30 to 96 wt % monomeric 4,4' MDI, about 2–70 wt % monomeric 2,4' MDI, and less than 5 wt % monomeric 2.2' MDI, and from 2–60 wt % higher ring homologues of the MDI series (with the wt % totaling 100%).

13. The method of claim 11 in which the propylene, oxide based polyether polyol is an ethylene oxide capped polypropylene polyether polyol.

14. The method of claim 11 in which 0 to 60 wt % of the polyol composition comprises a di or multi-functional alkylene ether polyol, a polyester polyol, a polyester polyol from polycarbonate or a hydroxyl terminated polybutadiene.

15. The method of claim 14 in which the polyurethane prepolymer composition consists essentially of less than 0.5 wt % free MDI monomer and contains a free prepolymer NCO functionality ranging from 0.5 to 8 wt %.

16. The method of claim 15 in which the polyol composition has an average Mn ranging from about 400 to 16,000.

\* \* \* \* \*